United States Patent Office

3,294,736
Patented Dec. 27, 1966

3,294,736
POLYOLEFINS STABILIZED WITH BISPHENOLS AND ORGANIC PHOSPHITES CONTAINING MERCAPTO GROUPS
Carl N. Jacob, Cincinnati, Ohio, assignor to National Distillers and Chemical Corporation, New York, N.Y., a corporation of Virginia
No Drawing. Filed Aug. 23, 1963, Ser. No. 304,209
7 Claims. (Cl. 260—45.95)

This invention relates to a method of stabilizing polymers of aliphatic olefins. In particular, this invention relates to a synergistic combination of compounds that protects polyolefin polymers against molecular degradation and color development during processing and subsequent use.

Polymers of aliphatic olefins, such as for example polypropylene, have numerous valuable properties which permit them to be used in the manufacture of pipe, film, wire coating, or various molded objects such as bottles and the like. These polymers have high tensile strength, are not subject to stress cracking, and display very little creep under load. It has been observed, however, that such polymers under conditions of elevated temperature and/or mechanical working, particularly in the presence of oxygen, undergo molecular degradation resulting in a deterioration of physical properties. Adequate stabilization of such polymers is of utmost importance in order to protect the polymer during fabrication and use. The molecular breakdown which occurs in these polymers during fabrication is evidenced by a substantial increase in the melt flow rate.

Generally, molecular degradation can be prevented to a satisfactory degree through the incorporation of a minor amount of one or a combination of additives. Particularly effective additives for this purpose include a number of alkylated bisphenols. The use of these compounds, however, is generally accompanied by undesirable color development, particularly in polyolefins containing trace quantities of metallic catalyst residues, e.g., vanadium, titanium, chromium, etc., such as may be introduced by Ziegler or Phillips-type catalysts.

It is an object of this invention to provide a combination of additives that will stabilize polyolefins against molecular degradation without undesirable color development. Another object is to provide a synergistic combination of stabilizers including a hindered bisphenol, the combination being resistant to undesirable color development. Another object is to provide novel polyolefin compositions containing a synergistic combination of compounds that improves the stability of the polyolefin compositions with respect to molecular breakdown and color development. Still another object is to provide novel polypropylene compositions having improved stability against molecular degradation and color development during processing and subsequent use. Other objects of the invention will be apparent from the description and claims that follow.

It has been discovered that polymers of aliphatic olefins having from 2 to 8 carbon atoms per molecule can be stabilized, and degradation and color development prevented, by incorporating in them synergistic combinations of minor amounts of alkylated bisphenols and organic phosphites of the aliphatic series, which phosphites include mono-, di- and trialkyl phosphites and alkylmercaptoalkyl phosphites. The utilization of these two types of components in combination results in a stabilizing effect far in excess of that obtained by other combinations of components and, thereby, a markedly improved product. Although alkylated bisphenols alone are effective in stabilizing polyolefins, for example, extending the onset of breakdown on the mill from approximately three minutes for unstabilized polypropylene polymer to beyond seven hours for the stabilized composition, the development of substantial and intermediate color is inevitable with these compositions. The alkyl phosphites or alkylmercaptoalkyl phosphites contribute to some extent to stabilization of polypropylene as a sole stabilizer. Synergistic combinations of alkyl phosphites or alkylmercaptoalkyl phosphites together with bisphenols, however, are extremely effective for stabilization of polyolefins to fabrication and subsequent use. These stabilization systems will provide complete processing stability for a milling period of several hours. Under these conditions polyolefins that have been stabilized with this system exhibit superior stability and superior light color as well as retention of light color as compared to known commercial polyolefins.

Many conventional additives which have been proposed for specific stabilization purposes have been found ineffective in polyolefin polymers. In addition, the utilization of multiple stabilizers has resulted in many cases in an inhibiting effect of one on the other. Prediction of the effectiveness of individual stabilizers has not been employed satisfactorily because of the many factors and variables that one must contend with in attempting to find a compatible and balanced stabilization system. At least as unpredictable is the determination of whether or not a given combination of two or more stabilizer compounds will synergize to produce a stabilizing effect in polyolefins that is greater than the additive effect of the individual stabilizers. We know of no method whereby a combination of stabilizers can be predicted to be synergistic stabilizers for polyolefin compositions short of actually testing the combination in a polyolefin composition, even though the individual components comprising the combination may be well-known stabilizers for various polymers, resins, or plastics including polyolefin compositions.

Apart from the fact that it is an unexpected scientific discovery when two stabilizers are found that will synergize with each other in polyolefin compositions, there are certain practical commercial advantages that often accompany the use of such combinations of stabilizers, as distinguished from the use of a single stabilizer material or compound. For example, one of the stabilizers of the combination might be costly or difficult to acquire in commercial amounts, while the other stabilizer of the combination might be relatively cheap and readily available. In such a situation it is desirable to be able to substitute the cheaper stabilizer for a portion of the more expensive stabilizer and still be able to obtain good stabilization through the synergism of the stabilizer combination. Thus, it is highly desirable in the polyolefin art to have available synergistic combinations of two or more stabilizers.

The polymers to which this invention applies are the normally solid polymers of aliphatic olefins having from 2 to 8 carbon atoms per molecule, such as polymers of ethylene, propylene, 1-butene, isobutylene, 2-butene, 1-pentene, 1-hexene, and copolymers thereof. Polymers made from olefins having more than two carbon atoms, for example, polypropylene or buteneethylene copolymers, are especially unstable as compared with polyethylene. The present invention is particularly suited to these polyolefins.

A great number of methods can be employed to prepare the normally solid polymers of olefins that are stabilized by this invention. These polyolefins may be linear or branched and may have either an irregular or regular steric structure. The method of manufacture of the polyolefins is unimportant with respect to this stabilization process.

As the alkyl phosphite component, a substantially nonvolatile phosphite is used that, in the minor proportion used, is soluble in the polyolefin at elevated temperatures of softening and non-separating therefrom at temperatures down to those of winter, as to about −60° F. The alkyl phosphites that meet the requirements and illustrate the class to be used are the straight chain and branched chain mono-, di-, and trialkyl phosphites, such as tributyl, trioctyl, triisooctyl, tridodecyl, trioctadecyl, monooctadecyl, dioctadecyl, monoisooctyl, and the like. The trialkyl phosphites are especially preferred.

The alkylmercaptoalkyl phosphites suitable for use in the practice of this invention have the formula $$(R-S-R')_n H_{3-n} PO_3$$

wherein R is a saturated aliphatic hydrocarbon radical containing from 6 to 18 carbon atoms, R' is a saturated aliphatic hydrocarbon radical containing from 2 to 4 carbon atoms, and n is an integer with a value of 1, 2, or 3. Examples of such compounds include tris(laurylmercaptoethyl) phosphite, tris(stearylmercaptoethyl) phosphite, bis(caprylmercaptobutyl) phosphite, mono(palmitylmercaptopropyl) phosphie, tri(2-ethylhexylmercaptoethyl) phosphite, and the like. In a preferred embodiment of this invention tris(laurylthioethyl) phosphite is employed.

The stabilization of polymers of aliphatic olefins with alkylmercaptoalkyl phosphites alone, however, has been set forth and claimed in copending application Serial Number 304,245, filed August 23, 1963, now abandoned.

The alkylated bisphenols suitable for this invention include 4,4'-thio-bis(2-tert-butyl-5-methylphenol), 4,4' - bis-(2-methyl-6-tert-butyl phenol), 4,4'-bis(2,6-di-tert - butyl phenol), 2,2'-methylene-bis(4-methyl-6-tert-butyl phenol), 2,2'-methylene-bis(4-ethyl-6-tert-butyl phenyl), 2,2'-methylene bis-(4-methyl-6-tert-dodecylphenol), 2,2'-methylene bis-(4-tert-octyl-6-methylphenol), 2,2'-methylene bis-(4,6-tert-butylphenol), 2,2'-methylene bis-(4,6-tert-dodecylphenol), 2,2' - methylene bis - (4,6 - diamylphenol), 2,2'-methylene bis-(4-tert-butyl-6 - tert - dodecylphenol), 2,2'-methylene bis-(4,6-dioctylphenol), 2,2'-methylene bis-(4-butyl-6-amylphenol), and 2,2'-methylene bis-(4-octyl - 6-dodecylphenol). Other alkylene bis-(dialkylphenols) can be used, such as the corresponding ethylene, propylene, and butylene bis-(dialkylphenols), for example 2,2'-ethylidene bis-(4-methyl-6-tert - butylphenol), 2,2' - ethylidene bis-(4,5-ditert - dodecylphenol), 2,2' - isopropylidene bis-(tert-butyl-6-amylphenol), 2,2'-isopropylidene bis-(4,6-di-tert-dodecylphenol), and the like.

These compounds may be mixed with the polyolefin polymer in any suitable manner that will effect thorough distribution and dispersion. This can be accomplished in a machine suitable for mixing solids, as by milling the polyolefin with the additive on heated rolls, such as are used in the compounding of rubber, or on other suitable milling or mixing equipment, such as for example a Banbury mixer or conventional rubber mill. Instead of adding the stabilizing agent to the polymer in the solid or molten state, it can be added to a solution or suspension of polymer in an organic solvent or to an aqueous dispersion thereof and the volatile solvent subsequently removed by vaporization. Another method is to dust the solid onto pellets of the resin and extrude the mixture.

In general, the amount of agent to be added to the polyolefin polymer depends upon the degree and kind of stabilization desired. The amount of agent added can vary from about 0.005 to 5.0%, based on the weight of the polyolefin, but as a rule it is preferred to use the minimum amount required to achieve the desired results. The preferred amount of each additive used will ordinarily vary from about 0.05 to 0.5 part by weight per hundred parts of polyolefin. Approximately equal weight quantities of the bisphenol and the alkyl phosphite or the alkylmercaptoalkyl phosphite are generally preferred, although the ratio of the ingredients in the synergistic combination may vary from 10–90% of the bisphenol and from 90–10% of the alkylmercaptoalkyl phosphite.

The stabilizer combination of the present invention leads to polyolefin compositions of improved stability and, more specifically, of improved stability against deterioration and color formation. Thus, polyolefins stabilized in accordance with this invention have an extended life expectancy and can be used more effectively than unstabilized polyolefins for a wide diversity of uses. These polyolefins may be cast, extruded, rolled, or molded into sheets, rods, tubes, piping, filaments, and other shaped articles, including widely used films of the polymer about 0.5 to 100 mils in thickness. The present composition may be used for coating paper, cloth, wire, metal foil, glass fiber fabrics, synthetic and natural textiles, and other such materials. Likewise, small amounts of other additives such as other polymers, resins, or plastics that are commonly added to polyolefins for specific uses and that are not deleterious to the effectiveness of the present synergistic combination may be used in the polyolefin compositions of the invention.

Following are examples illustrating the invention, although it is in no way intended to limit the invention thereto.

*Example I*

The samples for testing were compounded in the following manner: The polyolefin was granulated to 10 mesh and extracted by means of a Soxhlet extraction for 24 hours, using a mixture of isopropanol and cyclohexane. The polymer was then thoroughly dried to remove all traces of solvent. A quantity of the extracted polyolefin was then put into a Hobart mixer and the antioxidant to be tested was added as a 1% benzene or acetone solution by means of a hypodermic needle to get a good dispersion of the antioxidant throughout the polymer. This mixture was allowed to stir until all of the solvent had evaporated off. Four hundred grams of the polymer with antioxidant added was then milled on the two-roll, differential speed rubber mill at 350° F. Approximately 30 grams of polymer was removed from the mill at 5, 10, 20, 30, and 60 minute intervals. Timing started when the polymer reached flux (when all of the polymer was melted and banded). Samples of each cut were then submitted for flow data. A sample of each cut was pressed into a 1" x 1" x 50 mil sheet and mounted on white cardboard for color comparison.

Thermal and oxidative breakdowns were determined by measuring the change in flow rate (ASTM test method D 1238–57T; 2160 g. load; 190° C. for polyethylene and 230° C. for polypropylene) and by observing the color change upon extended milling at 350° C.

Test results are given in the table to illustrate the use of the stabilizers for polypropylene. The percentages shown are percent by weight.

TABLE

| Stabilizer | Concentration, wt. percent of polymer | Milling Time, minutes | Initial Melt Flow Rate | Final Melt Flow Rate | Final Color a |
|---|---|---|---|---|---|
| None | 0 | 0 | 5.9 | | 1 |
| Do | 0 | 5 | | 15 | |
| Do | 0 | 10 | | 26 | 6 |
| Do | 0 | 15 | | Liquid | |
| Tris(laurylmercaptoethyl) phosphite | 0.5 | 60 | 4.2 | 5.3 | 1 |
|  | 0.2 | Immediate break-down | | | |
| Cyanamid 162 b | 0.5 | 60 | 3.3 | 3.8 | 4 |
|  | 0.2 | 60 | 3.3 | 3.4 | 2 |
| Cyanamid 162 b | 0.5 | 60 | 3.3 | 3.9 | 3 |
| Tris(laurylmercaptoethyl) phosphite | 0.1 | | | | |
| Cyanamid 162 b | 0.2 | 60 | 3.4 | 3.3 | 2 |
| Tris(laurylmercaptoethyl) phosphite | 0.2 | | | | |
| Cyanamid 2246 c | 0.5 | 60 | 2.1 | 2.3 | 5 |
| Cyanamid 2246 c | 0.2 | 60 | 2.1 | 2.1 | 1 |
| Tris(laurylmercaptoethyl) phosphite | 0.2 | | | | |
| Santonox R d | 0.2 | 420 | 2.3 | 7.4 | 2 |
| Santonox R d | 0.2 | 420 | 2.2 | 3.8 | 1 |
| Tris(laurylmercaptoethyl) phosphite | 0.2 | | | | |
| Triisooctyl phosphite | 0.5 | 60 | 8.7 | 10.0 | 3 |
| Ethyl 725 e | 0.2 | 60 | 1.9 | 2.0 | 5 |
| Triisooctyl phosphite | 0.2 | | | | | a 1=White with no color change. 2=White with slight haze. 3=Uniform light color. 4=Uniform medium color. 5=Uniform heavy color. 6=Complete discoloration.
b Cyanamid 162=2,2′-methylene-bis(4-ethyl-6-tert-butyl phenol).
c Cyanamid 2246=2,2′-methylene-bis(4-methyl-6-tert-butyl phenol).
d Santonox R=4,4′-thio-bis(2-tert-butyl-5-methyl phenol).
e Ethyl 725=4,4′-bis(2-methyl-6-tert-butyl phenol).

As will be evident to those skilled in the art, various modifications of this invention can be made or followed in the light of the foregoing disclosure and discussion without departing from the spirit or scope thereof.

What is claimed is:

1. A polymer of an aliphatic mono alpha olefin having from 2 to 8 carbon atoms per molecule stabilized with from about 0.05 to 0.5 part by weight per hundred parts of polymer of a synergistic combination of an alkylated bisphenol and a trialkylmercaptoalkyl phosphite.

2. A polymer of an aliphatic mono alpha olefin having from 2 to 8 carbon atoms per molecule stabilized against molecular degradation under conditions of elevated temperature and mechanical working with from about 0.05 to 0.5 part by weight per hundred parts of polymer of a synergistic combination of an alkylated bisphenol and a trialkylmercaptoalkyl phosphite.

3. Polypropylene stabilized with about 0.05 to 0.5 part by weight per 100 parts of polymer of each of the two components of a synergistic combination of 4,4′-thio-bis(2-tert-butyl-5-methyl phenol) and tris(laurylmercaptoethyl) phosphite.

4. Polypropylene stabilized with 0.05 to 0.5 part by weight per 100 parts of polymer of each of the two components of a synergistic combination of 2,2′-methylene-bis(4-methyl-6-tert-butyl phenol) and tris(laurylmercaptoethyl) phosphite.

5. Polypropylene stabilized with 0.05 to 0.5 part by weight per 100 parts of polymer of each of the two components of a synergistic combination of 2,2′-methylene-bis(4-ethyl-6-tert-butyl phenol) and tris(laurylmercaptoethyl) phosphite.

6. Polypropylene stabilized with a combination of 0.2 part by weight per 100 parts of polypropylene of 2,2′-methylene-bis(4-methyl-6-tert-butyl phenol) and 0.2 part by weight per 100 parts of polypropylene of tris(laurylmercaptoethyl) phosphite.

7. Polypropylene stabilized with a combination of 0.2 part by weight per 100 parts of polypropylene of 2,2′-methylene-bis(4-ethyl-6-tert-butyl phenol) and 0.2 part by weight per 100 parts of polypropylene of tris(laurylmercaptoethyl) phosphite.

References Cited by the Examiner

UNITED STATES PATENTS

| | | | |
|---|---|---|---|
| 2,587,616 | 4/1952 | Harman | 260—461 |
| 2,967,845 | 1/1961 | Hawkins et al. | 260—45.7 X |
| 2,972,597 | 2/1961 | Newland et al. | 260—45.85 |
| 2,995,539 | 8/1961 | Barker et al. | 260—45.7 X |
| 3,053,803 | 9/1962 | Jaffe et al. | 260—45.95 |
| 3,149,093 | 9/1964 | Hecker et al. | 260—45.7 X |

FOREIGN PATENTS 66,455   9/1950   Netherlands _____ 260—45.95

DONALD E. CZAJA, Primary Examiner.

LEON J. BERCOVITZ, Examiner.

M. J. WELSH, Assistant Examiner.